United States Patent [19]
Webb

[11] 4,036,345
[45] July 19, 1977

[54] CONVEYORS

[75] Inventor: John Edmund Richard Webb, Bodorgan, Wales

[73] Assignee: Hydaroll Limited, Birmingham, England

[21] Appl. No.: 594,447

[22] Filed: July 9, 1975

[30] Foreign Application Priority Data

Oct. 11, 1974  United Kingdom ............... 44156/74

[51] Int. Cl.² .......................................... B65G 13/12
[52] U.S. Cl. .......................... 193/35 SS; 193/35 MD; 193/37; 308/238; 308/DIG. 8; 308/DIG. 9
[58] Field of Search .................. 193/35 SS, 37, 35 R, 193/35 MD; 214/84; 308/6 R, DIG. 7, DIG. 8, DIG. 9, 238; 16/18, 24–27, 43; 206/318

[56] References Cited

U.S. PATENT DOCUMENTS

| | | | |
|---|---|---|---|
| 1,963,956 | 6/1934 | Craig | 193/35 MD |
| 2,686,155 | 8/1954 | Willis et al. | 308/DIG. 9 |
| 2,931,477 | 4/1960 | Metzgar | 193/35 MD |
| 2,973,073 | 2/1961 | Elliott | 193/35 SS |
| 3,011,665 | 12/1961 | Wise | 193/35 SS |
| 3,056,709 | 10/1962 | Rising et al. | 308/DIG. 7 |
| 3,130,829 | 4/1964 | Long | 193/35 SS |
| 3,211,502 | 10/1965 | Lamson et al. | 308/DIG. 8 |
| 3,422,732 | 1/1969 | York | 193/37 |
| 3,690,485 | 9/1972 | Fischer et al. | 193/35 SS |

FOREIGN PATENT DOCUMENTS

| | | | |
|---|---|---|---|
| 2,021,164 | 12/1971 | Germany | 193/35 MD |
| 954,249 | 4/1964 | United Kingdom | 214/84 |
| 1,302,004 | 1/1973 | United Kingdom | 308/DIG. 8 |

OTHER PUBLICATIONS

Trends from Machine Design V. 37, No. 13, p. 177, dated June 10, 1965.
Bonded Coatings from Product Engineering, pp. 48–53, dated Sept. 5, 1960.

*Primary Examiner*—Evon C. Blunk
*Assistant Examiner*—Jeffrey V. Nase
*Attorney, Agent, or Firm*—Blanchard, Flynn, Thiel, Boutell & Tanis

[57] ABSTRACT

A platform conveyor device for transporting loads, comprising a plurality of spaced apart elongate members alternate ones of which carry rotatable bearing members and are reciprocatable vertically by compressed air hoses so that in an uppermost position loads can be transported over a load bearing surface formed by remaining ones of the members and in a lowermost position loads rest on the load bearing surface.

14 Claims, 7 Drawing Figures

CONVEYORS

The invention relates to conveying apparatus and concerns a platform device on which a load or loads can be positioned and then immovably supported.

Previously the handling of loads has been difficult, particularly when a load such as a heavy crate has to be manoeuvred into a desired position for transport or storage. Such a load should be easily moved in any direction to the desired position, where it should be vertually immobilised and kept safely until it is desired to move it again for example to unload it from a vehicle in which it is being transported.

It is among the objects of the invention to provide apparatus which can enable a load to be relatively easily stored and handled.

According to one aspect of the invention there is provided a platform device for material handling which comprises a fixed frame means in turn having a plurality of spaced apart elongate support members and a plurality of discrete elongate members, the plurality of discrete elongate members being attached to the upper surface of the elongate support members and extending at right angles to the length of such elongate support member. The platform device further comprises a movable frame means having a plurality of spaced apart elongate support members and a plurality of discrete elongate members, the latter being attached to the upper surface of the former and extending at right angles to the length of the former. The fixed and movable frame means are so arranged that their respective elongate support members are parallel and interdigitate and their respective discrete members are parallel and interdigitate. Plural individual rotatable members are set in and extend above the plane of the upper surface of the discrete elongate members of the movable frame means. Inflatable means attached to the under surface of the elongate support members of the movable frame are operable to raise and lower the movable frame means so that in the lower position of the movable frame means a load is supported on the aforementioned upper surface of the discrete elongate members of the fixed frame means, and in a raised position of the movable frame means the rotatable members extend above the plane of such discrete elongate members of the fixed frame means for moving a load over the platform device.

The inflatable means may comprise a plurality of inflatable hoses.

The rotatable members may each comprise a housing and a bearing member in the housing, the housing and/or the bearing member providing a self-lubricating and/or self-cleaning surface.

Further, the housing and/or the bearing member in the housing may be made from a material comprising nylon and graphite. The nylon may be "filled" with glass.

The housing may include an exterior surface having retaining means the arrangement of the retaining means on the exterior surface being such that the housing is secured by the retaining means in particular of the discrete members surrounding the housing.

The retaining means may comprise a flange which may extend around a periphery of the exterior surface of the housing.

The flange may be intermediate the length of the housing.

The flange may be triangular in cross-section.

The bearing may be spherical ball bearing.

The housing may include a lateral wing or flange in which there is means adapted for securing the housing to the member.

The nylon and graphite may initially be in the form of powder which is blended together to form a mixture and is then moulded to the required shape to form the housing or bearing.

The self-lubricating property may be provided by a substance other than carbon, for example molybdenum disulphide.

According to a second aspect, the invention provides a vehicle including a platform device as hereinbefore described.

A construction according to the invention is diagrammatically illustrated, by way of example, in the accompanying drawings, in which.

Figure 1:
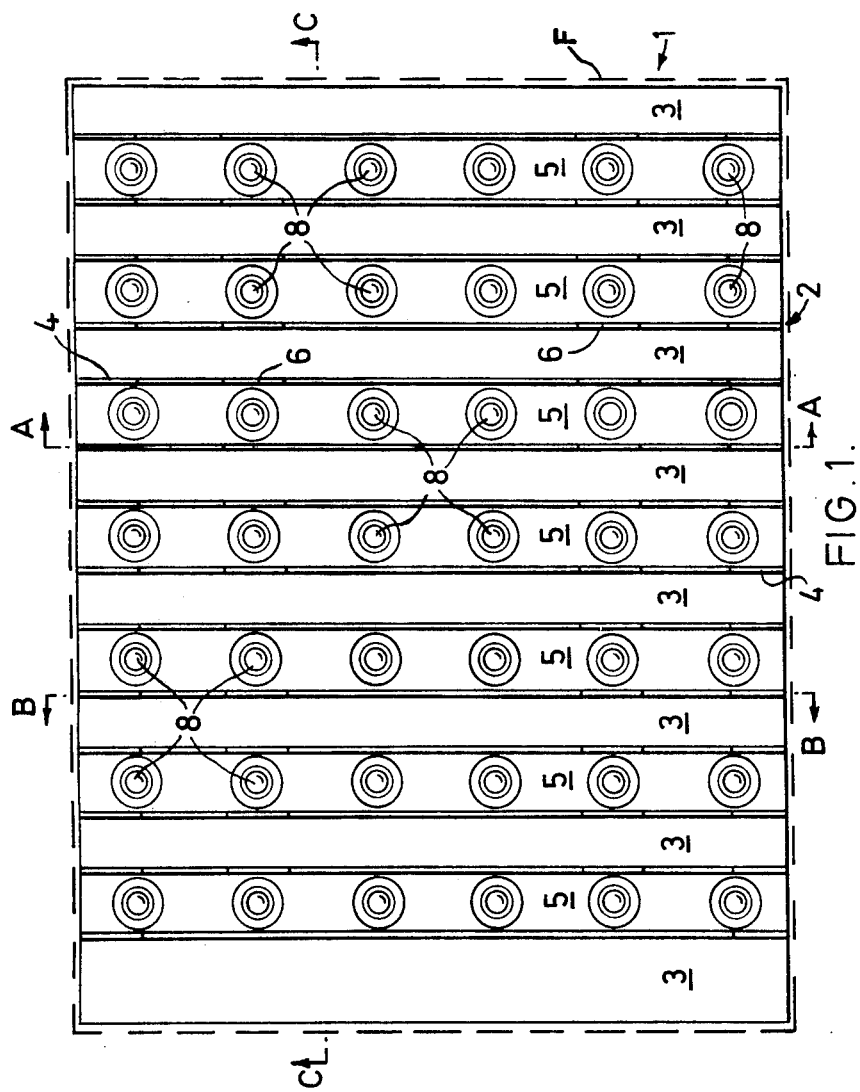
FIG. 1 shows a plan view.
Figure 2:
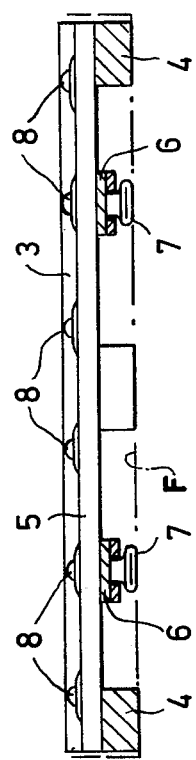
FIG. 2 shows a transverse vertical section on the line A — A of FIG. 1.
Figure 3:
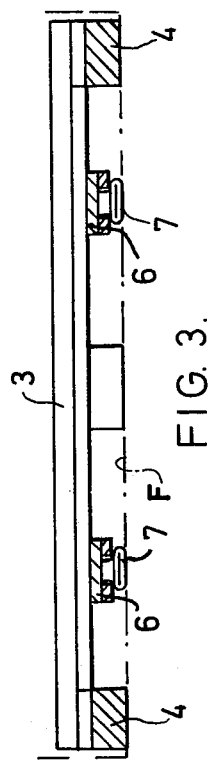
FIG. 3 shows a transverse vertical section the line B — B of FIG. 1.
Figure 4:
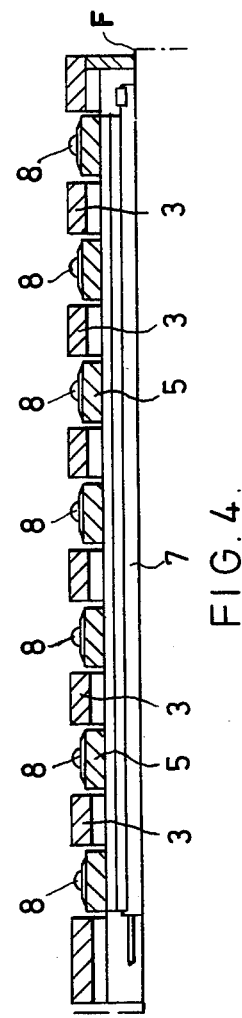
FIG. 4 shows a longitudinal vertical section on the line C — C of FIG. 1.

Referring to the drawings, the platform device 1 comprises spaced elongate cross-members 2 which in the embodiment shown are wooden. Alternate cross-members 3 are secured at their ends to stretchers, or support members, 4 which run transversely of the cross-members, and form a frame.

Disposed between the cross-members 3 are further elongate cross-members 5 which are securely mounted on support members 6 each of which is mounted on a pair of parallel, inflatable tubes or hoses 7 which can be inflated by for example air from an engine driven compressor through a suitable reducing valve (when the device is in a vehicle) or by a hand driven pump via a three way valve. In either case there is an independently mounted pressure gauge (not shown) and a T-Junction (also not shown) which feeds both tubes 7.

The tubes 7 could be inflated by an independent compressed air supply, a 12v or 24v electric compressor, or the servosystem of a vehicle in which the device is mounted.

The tube or hose 7 is pressurised in the embodiment shown to 30 P.s.i for raising the members 5.

Each member 5 has protruding therefrom a plurality of spaced apart rotatable members 8 in the form of ball bearings 10 for example steel ball bearing 10 mounted in a housing 12. The housing 12 is made of a material which is a mixture of nylon, glass and graphite powders. A suitable nylon is the powder Maranyl A 198 of Imperial Chemical Industries Limited.

The powdered nylon and graphite, also in the form of powder, are mixed together, for example in the range of 5 to 15 weight percent of graphite in relation to the weight of nylon, the glass being up to 33⅓ wt.%. The mixture of powders is then moulded preferably under heat and pressure to the required shape of the housing. The "fill" of glass provides strength and durability.

The housing 12 has a cup shaped recess 13 in which the ball 10 seats. And edge 14 of the recess engages the surface of the ball beyond the equator of the ball so that the ball is firmly held in the cup-shaped recess 13.

The surface of the recess which engages the ball 10 is self-lubricating and/or self-cleaning so that rotation of the ball is not hindered or prevented by "seizing" of the bearing or by the accumulation of debris, dirt or other foreign matter in the bearing.

The housing has a wing or flange 15 which has means in the form of holes 16 which are adapted for securing the housing the cross-members 5 by the passage of for example, screws (not shown) into the members 5. Each movable member 5 has a row of the bearings 10.

The housing also has a bore 17 communicating the surface, adjacent the ball, of the recess 13, whith the exterior of the housing and through which debris, or dirt can pass automatically to ensure long life and free rotational movement.

Figure 6:
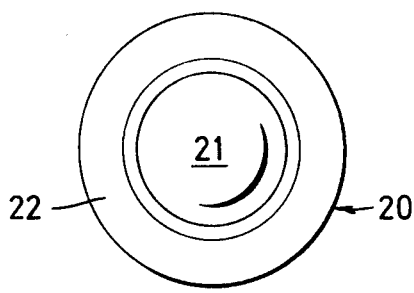
FIGS. 6 and 7 shows respectively, on a larger scale than that of FIG. 5, a plan view and a side elevational view of a second bearing.
Figure 7:
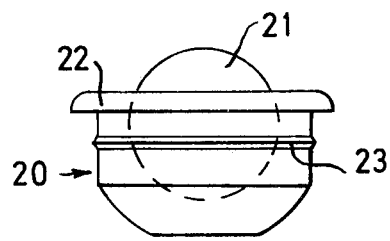

Referring now to FIGS. 6 and 7, the bearing shown is a modification and comprises a housing 20 in which is mounted for rotation a metal, for example steel ball bearing 21, a lip 22 defining one upper (as seen in FIG. 6) limit of the housing 20.

Intermediate the length of the housing and formed integral therewith there is retaining means in the form of a flange 23 which stands proud of the exterior surface of the housing 20. The flange 23 extends around the periphery of the exterior surface in a plane generally parallel to that of the lip 22, and has a triangular section.

The housing 20 as shown in FIG. 1 to 6 is in use received in a corresponding well or receptacle of a member 5 so that the ball bearing 21 in use stands proud of the member 5 to assist handling of loads thereon and thereover.

When the housing 20 is pushed with a force fit into the well or receptacle, the flange 23 engages the corresponding surface thereof. This engagement deforms the flange 23 which thereby ensures that the housing 20 is firmly retained in the well or receptacle.

The maximum height of the flange 23 may be 0.020. inch

The housing 20 may be moulded in one piece from plastics material, a suitable mould tool having a circumferential groove therein so that the flange is moulded integrally with the body of the housing.

Figure 5:
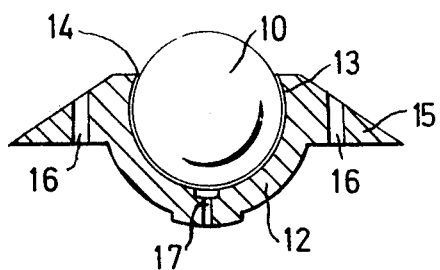
FIG. 5 shows a vertical cross section through a bearing.

The housing 20 has a bore (not shown) similar to the bore 17 of the bearing of FIG. 5.

The plastics material may be made of a material which in use is self-cleaning and self-lubricating so that rotation of the ball bearing is not prevented or hindered. The plastics is also strong and can resist deformation or failure under imposed loads. A suitable material is thus a nylon filled with glass and graphite.

Although a plastics housing with a steel bearing has been described, it will be understood that the ball bearing may be plastics of the kind embodying the invention and the housing may be of metal.

The ball bearing can have a diameter of from half an inch to two inches preferably one inch, and can carry a load of 150 lbs (68 Kg) per inch diameter of ball.

The members 5 are raised above the plane of the support surface and so that in their uppermost position by inflation of the tubes of hoses 7 the ball bearings 10, 21 extend can be used to move a load over the support surface provided by the members 2. The movement can be in any desired direction since the ball bearing do not restrict the movement to a single direction. When the ball bearings are lowered (FIG. 4) by deflating the tubes or hoses 7, a load is immovably supported on the support surface provided by the members 3 of the plurality of discrete members 2.

When mounted in a vehicle the support members 4 are secured to the vehicle floor, and the device can take up the whole floor area as shown by dashed lines at F in FIG. 1. A space at the door end is completed with a filler 9 as shown. It will be understood that the device could be installed where ever loads are required to be conveyed and immobilised in a given position, for example in a warehouse.

All the members 3 and 5 may be wooden. It will be understood that the tubes or hoses 7 are fed with air from a common compressor etc via a T-piece. Moreover, any suitable means of raising the members 5 may be used there than the ones described, for example hydraulic jacks could be used.

I claim:

1. A platform device for material handling, comprising in combination:
    a fixed frame, said fixed frame comprising a plurality of spaced apart first elongate support members and a plurality of first discrete elongate members, said discrete and support members having upper surfaces, said plurality of discrete elongate members being attached to said upper surfaces of said elongate support members and extending at right angles to the length of said elongate support members;
    a movable frame, said movable frame comprising a plurality of spaced apart second elongate support members and a plurality of second discrete elongate members, said second discrete elongate members and said second elongate support members having upper surfaces, said second discrete elongate members being attached to said upper surfaces of said second elongate support members and extending at right angles to the length of said second elongate support members;
    the fixed and movable frames being so arranged that their respective elongate support members are parallel and their respective discrete members are parallel and interdigitate;
    a plurality of individual rotatable members set in and extending above said upper surfaces of said second discrete elongate members of the movable frame;
    inflatable means disposed under and attached to said second elongate support members of said movable frame and operable for raising and lowering the movable frame as a unit so that in a lower position of said movable frame a load can be supported on said upper surfaces of said first discrete elongate members of said fixed frame and in a raised position of said movable frame said rotatable members extend above the upper surfaces of said first discrete elongate members of said fixed frame for moving a load over said device.

2. The device of claim 1, wherein said inflatable means comprises a plurality of inflatable hoses.

3. The device of claim 1, wherein each of said rotatable members comprises a housing and a rotatable bearing ball member in the housing, the housing having a surface providing a self-lubricating surface and self-cleaning surface.

4. The device of claim 3, wherein said housing includes retaining means on its exterior surface, whereby said housing can be retained in a respective one of said second discrete elongate members of said movable frame.

5. The device of claim 4, wherein said retaining means comprises a flange which extends around the periphery of the exterior surface of said housing.

6. The device of claim 5, wherein said flange is of triangular cross-section.

7. The device of claim 3, wherein the housing is made of material comprising nylon and graphite.

8. The device of claim 3, wherein said housing is made of material comprising nylon and molybdenum disulphide.

9. The device of claim 7, wherein the nylon is filled with glass.

10. The device of claim 9, wherein there is 5 to 15 weight percent graphite in relation to the weight of nylon, and in which the glass is present up to 33⅓ weight percent of the total mixture weight.

11. The device of claim 3, wherein said housing has a lateral wing member protruding around its uppermost periphery.

12. The device of claim 3, wherein said housing has a bore extending between a cup for the bearing member and the exterior of the housing.

13. A platform device for material handling, comprising in combination:
- a fixed frame having a plurality of spaced apart support beams and a plurality of spaced apart transverse beams extending transversely of and fixed atop said support beams;
- a movable frame comprising a plurality of spaced apart support beams and a plurality of spaced apart transverse beams extending transversely atop said support beams of said movable frame in fixedly attached relation thereto, the support beams of said fixed and movable frames being parallel and the transverse beams of said fixed and movable frames being parallel and interdigitated with respect to each other;
- several of said transverse beams of said movable frame each having an upper surface with a lengthwise row of freely swivelable balls socketed thereon such that each ball has a top spaced above said upper surface of the corresponding transverse beam of the movable frame, and such that said ball rows are separated from each other by transverse beams of said fixed frame, several of said support beams of said movable frame underlying said transverse beams of said fixed frame and normally being separated therefrom by a clearance space with said tops of said balls no higher than said transverse beams of said fixed frame;
- lifting means engaging said support beams of said movable frame adjacent opposite sides of said movable frame and actuable for lifting said movable frame as a unit and into said clearance space;
- whereby a load carried on said transverse beams of said fixed frame is lifted therefrom by said balls on said movable frame, such that such load is supported for free movement in any direction in a plane parallel to the planes of said fixed and movable frames.

14. The device of claim 13, in which said lifting means comprises several inflatable hoses underlying said support beams of said movable frame, said lengthwise rows of balls each extending transverse to and across the several inflatable hoses and being separated from said hoses by said transverse beams of said movable frame.

* * * * *